W. F. H. BRAUN.
MEAT SLICER.
APPLICATION FILED SEPT. 29, 1921.

1,418,063.

Patented May 30, 1922.
2 SHEETS—SHEET 1.

WITNESS:

INVENTOR
William F. H. Braun
BY
Augustus B Stoughton
ATTORNEY.

UNITED STATES PATENT OFFICE.

WILLIAM F. H. BRAUN, OF PHILADELPHIA, PENNSYLVANIA, ASSIGNOR TO THE BRAUN COMPANY, OF PHILADELPHIA, PENNSYLVANIA, A CORPORATION OF PENNSYLVANIA.

MEAT SLICER.

1,418,063. Specification of Letters Patent. Patented May 30, 1922.

Application filed September 29, 1921. Serial No. 504,098.

*To all whom it may concern:*

Be it known that I, WILLIAM F. H. BRAUN, a citizen of the United States, residing at Philadelphia, in the county of Philadelphia and State of Pennsylvania, have invented a new and useful Improvement in Meat Slicers, of which the following is a specification.

The principal objects of the present invention are, first, to provide simple, convenient and reliable means whereby the meat table can be readily detached and removed as a unit and without carrying with it the feed screw nut or other parts of the machine and whereby the meat table can be readily replaced and properly held down; second, to provide improved means for controlling the movement of the meat table in its travel towards the knife and for applying to it the appropriate friction drag or retardation; third, to facilitate the engagement and disengagement of the feed screw nut; fourth, to provide for quickly and reliably connecting and disconnecting the meat table by the turning of a hand piece; and fifth, generally to simplify the construction and improve the operation of the means and mechanism by which the meat table is applied and removed and is automatically fed towards the knife and manually withdrawn from the knife.

The invention comprises the improvements to be presently described and finally claimed and in the description reference will be made to the accompanying drawings forming part hereof and in which—

Figure 1:
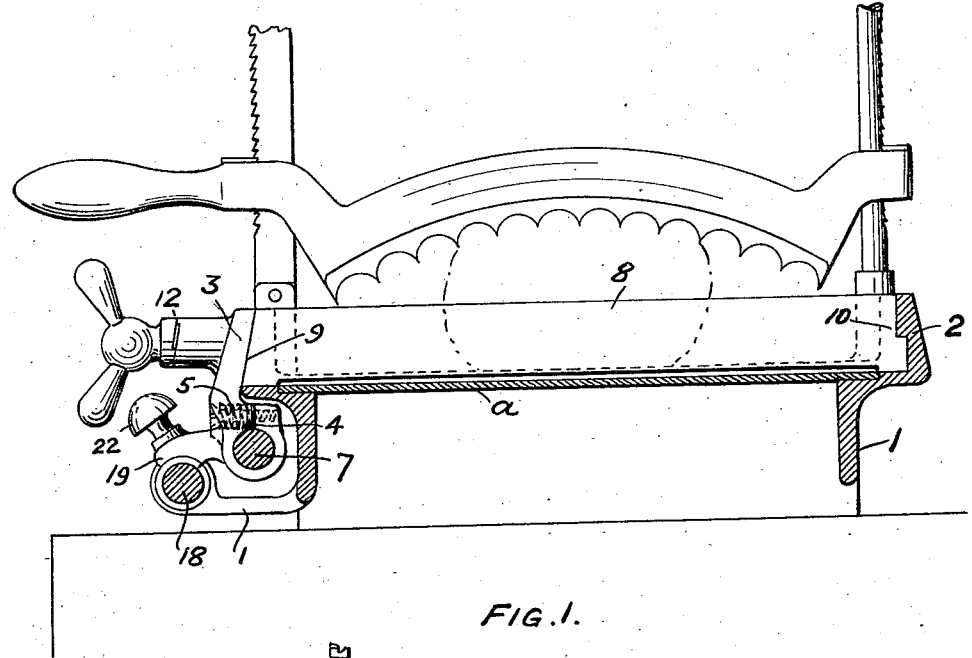
Figure 1 is a transverse sectional view of the traveler and meat table showing features of the invention.
Figure 2:
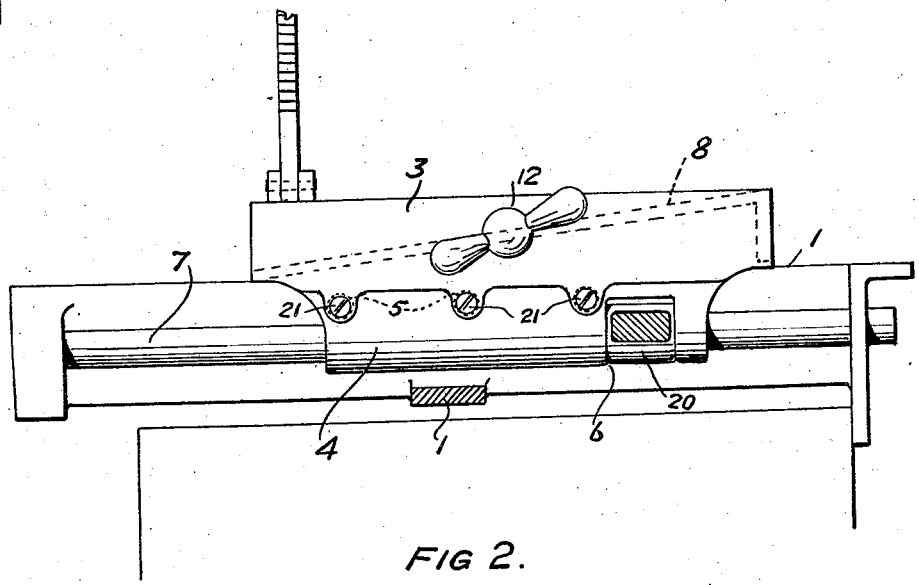
Fig. 2 is a view of the lefthand side of Figure 1 with parts removed.
Figure 3:
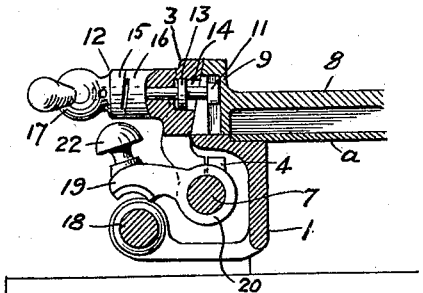
Figs. 3 and 4 are views, principally in transverse section, illustrating details of construction.

In the drawings, which show so much and such parts of a meat slicer as is necessary for a description of the invention, 1 is a traveler which, as is too well known to require particular description, is reciprocated in the plane of the knife or from side edge to side edge in Figure 1. 2 is a fixed rabbeted or undercut wall at one side of the traveler. 3 is a movable beveled or undercut wall arranged at the other side of the traveler and it is provided with a knuckle 4 split and spring pressed as at 5 and notched as at 6. 7 is a pintle rod carried by the traveler and on it the knuckle 4 is turnably and slidably mounted. 8 is a meat table slidably mounted on the traveler and it is provided with a beveled side wall 9 and with a rabbeted side wall 10. The wall 10 slides on the wall 2 and the wall 9 is clamped to the wall 3. 11 is a T-headed slot-and-pin connection interposed between the beveled side walls and provided with a manually operatable cam tightening device 12. The shoulder 13 on the stem of the T-head is arranged in a cavity 14 in the wall 3 and it serves as a stop for the crown cams 15 and 16 so that they may not make complete revolutions, the one in respect to the other. 17 is a hand piece on the stem of the T-head and it is connected with the cam 15, and the cam 16 is fast to the wall 3. 18 is a feed screw carried by the traveler and it is turned automatically by means of mechanism that is too well understood to require either illustration or specific description. 19 is a half nut for engaging and disengaging the feed screw 18, and it is provided with a hinge knuckle 20 slidably and turnably mounted on the rod 7 and arranged in the notch 6 of the knuckle 4 of the beveled wall 3. *a* is a cover plate that may be provided for the traveler under the meat table.

Figure 4:
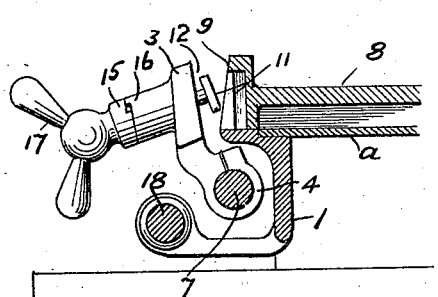
Figure 5:
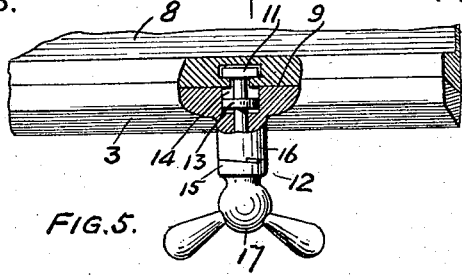
Fig. 5 is a top or plan view with parts broken away showing the device illustrated at the upper lefthand portions of Figs. 3 and 4.
Figure 6:
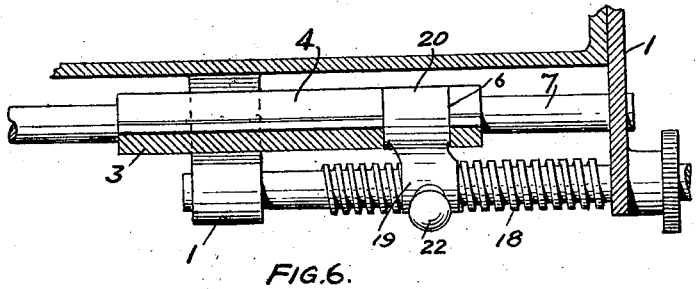
Fig. 6 is a top or plan view, partly in section, illustrating the feed nut.
Figure 7:
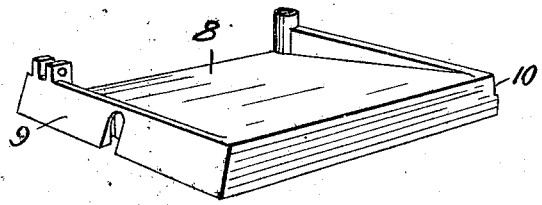
Fig. 7 is a perspective view of the meat table detached.

In use the parts being in the positions shown in Figure 1, the feed screw 18 is automatically turned with an intermittent motion and this motion of the feed screw acting upon the half nut slides the knuckles 4 and 20 towards the knife, not shown but well understood, or from right to left in Fig. 6. The knuckle 4 being clamped by the device 11 to the meat table 8, imparts its motion to the table which slides on the traveler and is held down by the rod 7 and undercut wall 2. The spring pressed split portion 5 of the knuckle 4 gripping the rod 7 provides the necessary drag or friction which can be increased or diminished by adjusting the screws 21. The meat carriage and the parts 3 and 4 can be quickly pulled away from the knife or moved from left to right in Fig. 6 by the simple operation of turning the half nut 19 on the rod 7 clear of the screw 18 and using the half nut or a handle as 22 provided on it as a means for pulling the meat table and connected parts back. To remove the meat table 8 the handle 17 is turned into the position shown in Fig. 4 and the wall 3 is turned clear of the meat table whereupon the latter can be lifted up. The meat table can be applied by a reversal of the last described operations.

It will be obvious to those skilled in the art that modifications may be made in details of construction and arrangement without departing from the spirit of the invention which is not limited as to those matters or otherwise than as the prior art and the appended claims may require.

I claim:

1. In a meat slicer the combination of a traveler, a fixed rabbeted wall at one side of the traveler, a movable beveled wall at the other side of the traveler and provided with a spring pressed split and notched knuckle, a pintle rod carried by the traveler and on which the knuckle is turnably and slidably mounted, a meat table provided with a beveled side wall and a rabbeted side wall co-operating with the like walls of the traveler, a T-head slot-and-pin connection interposed between the beveled side walls and provided with a manually operatable cam tightening device, a feed screw carried by the traveler, and a half nut for engaging and disengaging the screw and provided with a hinge knuckle turnably and slidably mounted on the rod and arranged in the notch of the knuckle of the beveled wall.

2. In a meat slicer the combination of a traveler provided at one side with a fixed undercut wall and at the other side with a pintle rod and feed screw, a meat table slidable in respect to the traveler and having a side wall co-operating with the fixed side wall of the traveler, and two hinge knuckles turnably and slidably mounted on the rod and in mutual engagement for sliding motion and whereof one is provided with a half nut for engaging and disengaging the screw and whereof the other is provided with a wall and a fastening device for engaging and disengaging the meat carriage, one of said knuckles being split and provided with a spring acting upon the split portion.

3. In a meat slicer the combination of a traveler provided at one side with a fixed undercut wall and at the other side with a pintle rod and feed screw, a meat table slidable in respect to the traveler and having a side wall co-operating with the fixed side wall of the traveler, and two hinge knuckles turnably and slidably mounted on the rod and in mutual engagement for sliding motion and whereof one is provided with a half nut for engaging and disengaging the screw and whereof the other is provided with a wall and a fastening device for engaging and disengaging the meat carriage.

WILLIAM F. H. BRAUN.